J. B. EASTES.
REVOLVING LAMP SUPPORT FOR AUTOS.
APPLICATION FILED JUNE 3, 1911.

1,025,966.

Patented May 14, 1912.

2 SHEETS—SHEET 1.

Witnesses

Inventor
J. B. Eastes

By _____, Attorneys

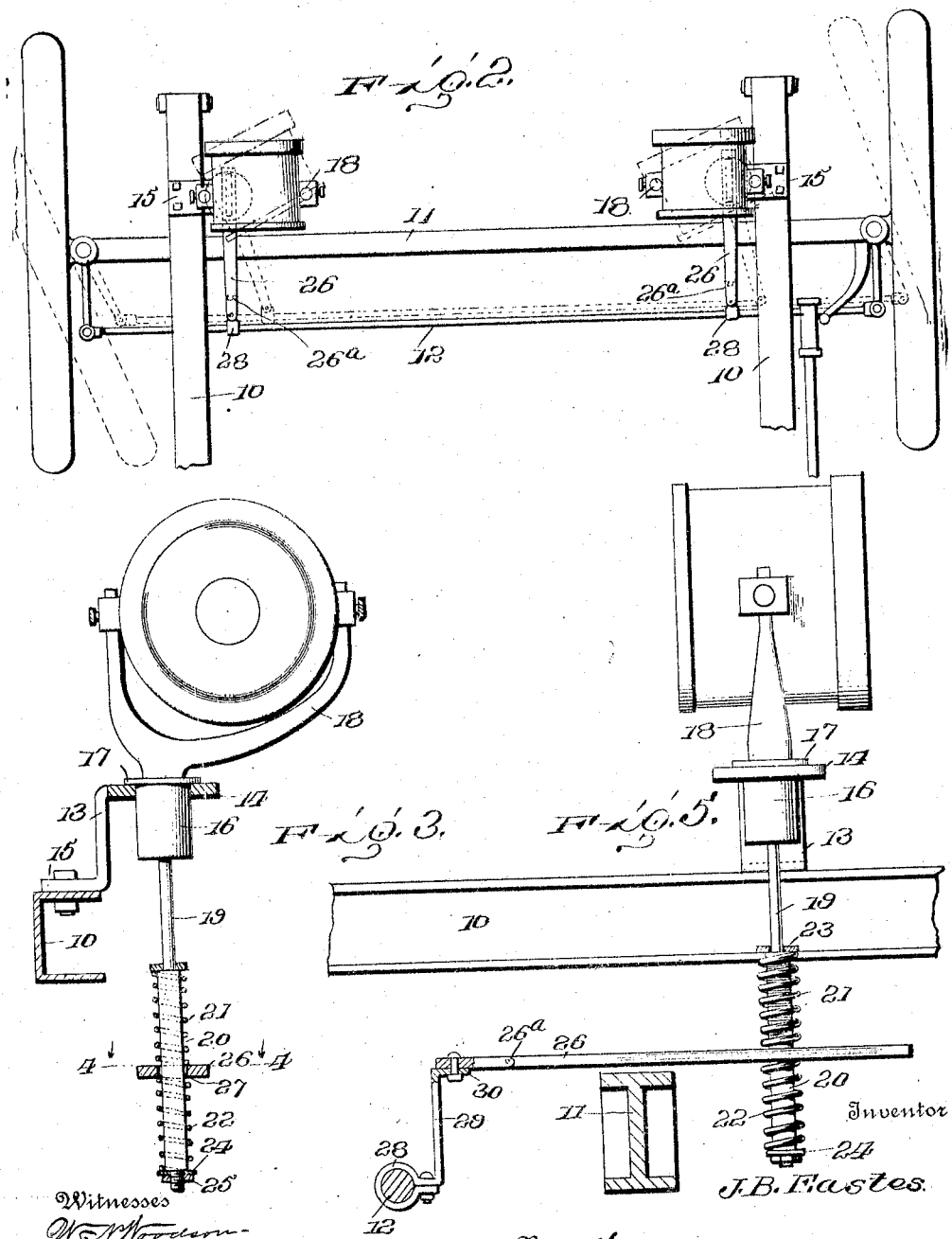

UNITED STATES PATENT OFFICE.

JAMES B. EASTES, OF KONAWA, OKLAHOMA.

REVOLVING LAMP-SUPPORT FOR AUTOS.

1,025,966.  Specification of Letters Patent.  Patented May 14, 1912.

Application filed June 3, 1911. Serial No. 631,147.

*To all whom it may concern:*

Be it known that I, JAMES B. EASTES, citizen of the United States, residing at Konawa, in the county of Seminole and State of Oklahoma, have invented certain new and useful Improvements in Revolving Lamp-Supports for Autos, of which the following is a specification.

This invention relates to lamp supports for automobiles, and the like, and refers particularly to an improved revolving support adapted to throw the rays of light from the lamps in the direction in which the vehicle moves, particularly when turning.

An object of this invention is to provide a simple attachment for the frame of the vehicle to take the place of the ordinary lamp bracket, or support, and which has peculiar connection with the steering mechanism to move therewith and turn the lamps in the angle in which the vehicle travels, when turning or moving straight ahead.

Another object of this invention is to provide a yielding connection between the lamp bracket and the steering mechanism whereby the vertical as well as the longitudinal movement of the frame upon the supporting springs is taken up without strain upon the connection and without interfering with the operation of the device.

The invention has for a further object to provide an independent revoluble mounting for each lamp, and an independent adjustable coupling between the mounting and the steering mechanism whereby the lamps may be adjusted to diverge or converge their rays of light, and at the same time admit of the turning of the same with the steering mechanism.

Figure 1:
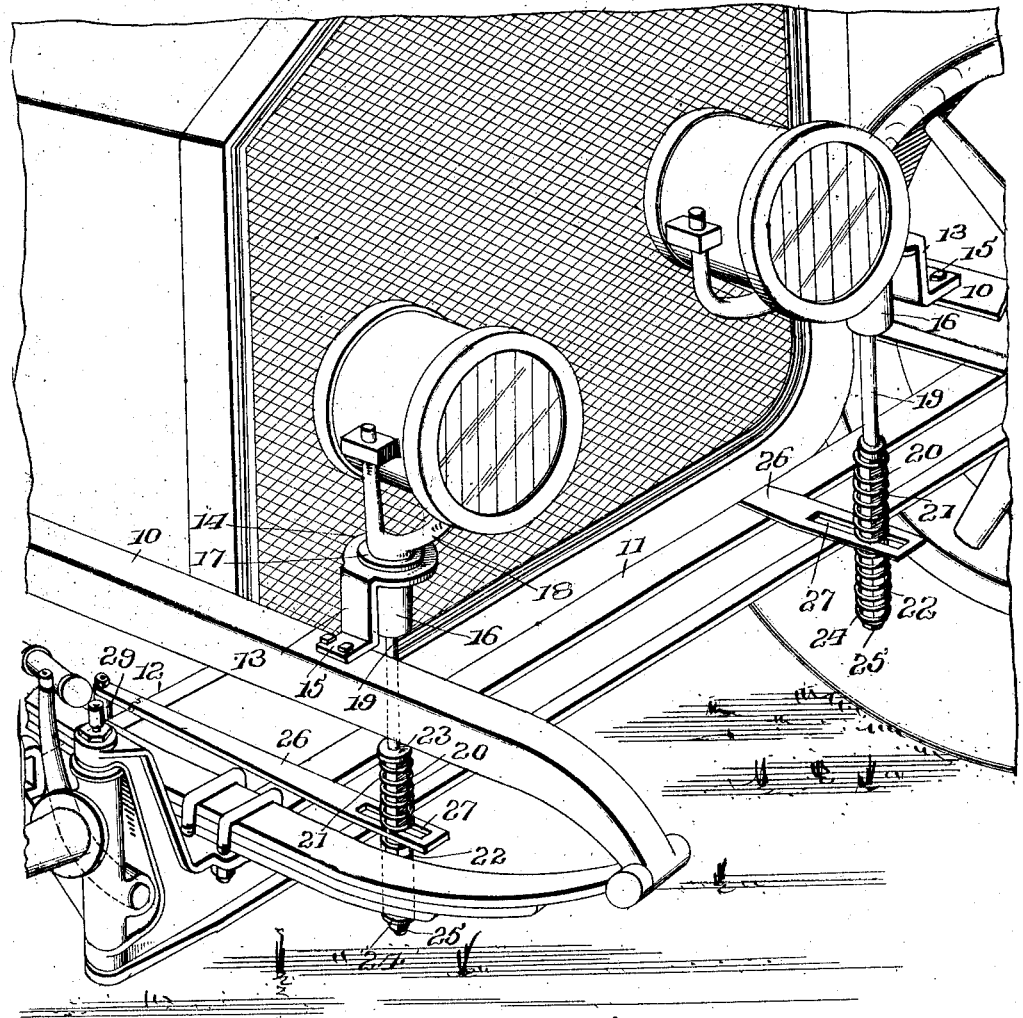
Figure 4:
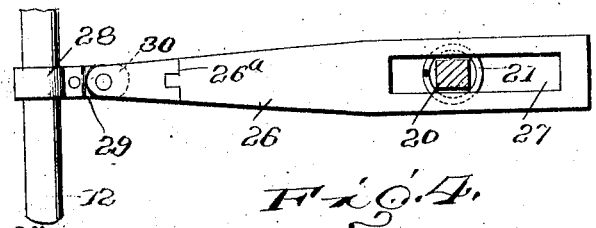

For a full understanding of the invention, reference is to be had to the following description and accompanying drawings, in which:

Figure 1 is a perspective view of a pair of the supports as applied to a motor vehicle; Fig. 2 is a top plan view of the same, showing an angular adjustment of the device in dotted lines; Fig. 3 is a rear elevation of one of the lamp supports applied to the frame of the vehicle, parts of the same being disclosed in section; Fig. 4 is a transverse section on the line 4—4 of Fig. 3; and, Fig. 5 is a side elevation of one of the supports applied to the frame of the vehicle, showing its relation to the axle and the connecting rod of the steering mechanism.

Corresponding and like parts are referred to in the following description and indicated in all the views of the drawing by the same reference characters.

Referring to the drawings 10 designated the side bars of the frame of a motor vehicle, which are suitably supported over the front axle 11. The axle 11 carries a steering mechanism provided with a connecting rod 12 disposed in parallelism rearwardly of the axle. It will be understood that the improved lamp support hereinafter disclosed may be applied to steering mechanisms varying in form other than shown, providing a connecting rod or a similar device to which the attachment may be applied.

Each of the side bars 10 of the vehicle is provided with a bracket 13, the same comprising an upstanding arm having a circular base 14 upon its upper end which preferably extends inwardly from the arm 12 and provided with an enlarged central circular opening. The arm 13 is suitably attached to the side bar 10, as by an out-turned flange 15 as shown through which bolts or other suitable fastening devices pass. A cylindrical block 16 fits down through the opening in the base 14 and engages rotatably and snugly therein, the block being held from downward movement by an annular flange 17 formed upon the upper end of the block and resting upon the upper face of the base 14. A fork 18 is rigidly carried upon the upper end of the block 16 and has its inner arm preferably offset inwardly in order to accommodate a lamp of considerable size inwardly of the frame.

Depending through the central portion of the cylindrical block 16 is a rod 19 which is provided with a non-circular section 20. This section carries upper and lower springs 21 and 22. An upper washer 23 is carried about the rod 19 against the upper end of the section 20 against which the upper end of the spring 21 bears. A lower washer 24 is fitted upon the lower end of the rod 19 against the lower extremity of the section 20 and is held thereon to support the lower end of the spring 22 by a nut 25. The nut 25 is threaded upon the lower end of the rod 19. A swinging bar 26 is employed having an elongated slot 27 in its forward enlarged end adapted to snugly and slidably receive the section 20, the opposite faces of the section 20 bearing against the marginal lateral edges of the slot 27. The inner opposite ends of the springs 21 and 22 engage against the opposite sides of the swinging bar 26 to yieldingly hold the same midway between the ends of the section 20. The swinging bar 26 is so adjusted upon the bar 19 that it passes rearwardly over the axle 11 of the vehicle in spaced relation thereto so as to admit of the free play of the axle without striking the bar 26. The connecting rod of the steering mechanism carries the adjustable clip 28 having a rigid upstanding arm 29 provided upon its upper end with a forwardly turned over lip 30 hingedly receiving the rear end of the swinging bar 26.

The opposite side bar 10 of the frame of the vehicle is provided with a similar support having connection to the connecting rod 12 adjacent to its opposite ends.

The swinging bar 26 is preferably constructed with a hinged portion 26ᵃ adjacent to its rear end so as to admit of the vertical swinging of the bar 26 as well as its pivotal movement upon the lip 30. The object in providing the springs 21 and 22 in combination with the hinged bar is that the springs will cushion the lamp so that the lamp will not vibrate with the free end portion of the bar 26. The bar 26 is hinged or pivotally mounted upon the lip 30 in order that the axle of the vehicle may have major movement with relation to the lamp support without moving the lamp support but the springs are for the purpose of absorbing the vibration or minor movement of the axle.

When the steering mechanism is operated to swing the road steering wheels into an angle for turning the vehicle, the clips 28 are moved toward one side of the vehicle and carry the rear ends of the swinging bars 26 therewith. This action rotates the bars 26 about their forward ends, the marginal edges of the slots 27 of the bars binding against the opposite sides of the sections 20, turning the latter with the bars. This movement rotates the depending rods 19 and the cylindrical blocks 16 through the base 14. It is thus seen that the forks 18 are turned through an angle corresponding to the angle of the road steering wheels and that the rays from the lamps are thrown in the direction in which the vehicle travels.

As can be seen from Fig. 2 the distance between the clips 28 and the lower ends of the slits 20, is shortened when the steering mechanism is swung into an angle, the longitudinal slots 27 in the swinging bars 26 admitting of the sliding movement of the sleeves toward the clips as the steering mechanism is turned.

Should it be desired to adjust the lamps to diverge their rays of light, the clips 28 may be adjusted longitudinally upon the connecting rod 12 to swing the lamps into the desired position. When in this position, and the steering mechanism is turned through an angle, the swinging bars 26 operate upon the sleeves 20 in the same manner as above disclosed. It is thus observed that the lamps may be revolubly adjusted, and at the same time, are connected to the steering mechanism so as to turn through the desired angle therewith.

It can be readily understood that this lamp support may be applied not only to automobiles, but also to locomotives, electric cars, and the like, the swinging bar 26 having suitable attachment to the truck to thereby receive swinging movement as the truck turns on curves.

Having thus described the invention, what is claimed is:

In combination with a wheel pivotally mounted to effect steering, a rod pivotally mounted and having a non-circular section, a bar pivotally mounted and having an elongated slot which receives the non-circular section of the rod, springs carried by the rod and bearing against the opposite sides of the arm, a lamp supported upon the rod and means for swinging the bar to turn the rod as the wheel is steered.

In testimony whereof, I affix my signature in presence of two witnesses.

JAMES B. EASTES. [L. S.]

Witnesses:
J. P. FORD,
E. M. TURNER.